(12) United States Patent
McLeod

(10) Patent No.: US 7,093,580 B2
(45) Date of Patent: Aug. 22, 2006

(54) ACTUATOR FOR VEHICLE ENGINE THROTTLES

(75) Inventor: Paul Warren McLeod, Martinez, GA (US)

(73) Assignee: Club Car, Inc., Augusta, GA (US)

(*) Notice: Subject to any disclaimer, the term of this patent is extended or adjusted under 35 U.S.C. 154(b) by 0 days.

(21) Appl. No.: 11/040,216

(22) Filed: Jan. 21, 2005

(65) Prior Publication Data

US 2005/0155573 A1    Jul. 21, 2005

Related U.S. Application Data

(60) Provisional application No. 60/537,628, filed on Jan. 20, 2004.

(51) Int. Cl.
*F02D 31/00* (2006.01)
*F02D 11/04* (2006.01)

(52) U.S. Cl. .................................. 123/376; 123/400

(58) Field of Classification Search ................ 123/400, 123/376, 398, 396, 583, 442, 584, 388; 74/502.6, 74/513
See application file for complete search history.

(56) References Cited

U.S. PATENT DOCUMENTS 5,165,298 A * 11/1992 Shier et al. ................ 74/502.6
5,750,056 A * 5/1998 Pitman et al. ................ 261/37
5,913,946 A * 6/1999 Ewing .......................... 74/513
5,984,232 A * 11/1999 Delorio, Jr. ................ 244/99.2

* cited by examiner

*Primary Examiner*—Andrew M. Dolinar
*Assistant Examiner*—Johnny H. Hoang
(74) *Attorney, Agent, or Firm*—Michael Best & Friedrich LLP

(57) ABSTRACT

An actuator is for a vehicle engine including a carburetor having a throttle plate moveable between a minimum open position and a maximum open position. The actuator includes an input member movably coupled with the vehicle so as to be displaceable between an initial position and a maximum displaced position. A flexible connector has a first end connected with the input member and a second end connected with the throttle plate such that movement of the input member displaces the connector to move the throttle plate between the minimum and maximum positions. A guide is configured to direct movement of the connector such that a rate of displacement of the throttle plate is varied as the input member moves between the initial and maximum positions. Preferably, the guide includes two curved guide members engageable with the connector to take up a portion thereof at an intermediate input member position.

47 Claims, 14 Drawing Sheets

ACTUATOR FOR VEHICLE ENGINE THROTTLES

This application claims priority to U.S. Provisional Application Ser. No. 60/537,628, filed Jan. 20, 2004, the entire contents of which are incorporated herein by reference.

BACKGROUND OF THE INVENTION

The present invention relates to gas-fueled vehicles, and more particularly to actuators for operating the throttle of the engines of such vehicles.

Throttle actuators, such as an "accelerator pedal" assembly, function to provide an appropriate interface between the operator and the vehicle powertrain. Typically, a flexible connector such as a cable extends between a pedal arm and the throttles, specifically the throttle valve or plate, such that the throttle opens when the pedal is depressed. The pull characteristic (cable travel vs. pedal position) greatly affects low speed maneuverability and the operator's perception of power. If the cable is pulled too aggressively at shallow pedal displacements then the vehicle will be difficult to maneuver in tight quarters. Conversely if the cable is pulled too little, the vehicle may be perceived as sluggish.

SUMMARY OF THE INVENTION

In one aspect, the present invention is an actuator for an engine of a vehicle, the engine including a carburetor having a throttle plate moveable between a minimum open position and a maximum open position. The actuator comprises an input member movably coupled with the vehicle so as to be displaceable between an initial position and a maximum displaced position. A flexible connector has a first end connected with the input member and a second end connected with the throttle plate. As such, movement of the input member displaces the connector to move the throttle plate between the minimum and maximum positions. Further, a guide is configured to direct movement of the connector such that a rate of displacement of the throttle plate is varied as the input member moves between the initial and maximum displaced positions.

In another aspect, the present invention is an actuator for use with a first vehicle engine and alternatively with a second vehicle engine, each engine including a carburetor with a throttle plate moveable between a minimum open position and a maximum open position. The actuator comprises an input member movably coupled with the vehicle so as to be displaceable between an initial position and a maximum displaced position. A flexible connector has a first end connected with the input member and a second end connected with the throttle plate. As such, movement of the input member displaces the connector to move the throttle plate between the minimum and maximum positions when the input member displaces between the initial and maximum positions. Further, the connector is either connectable with the input member such that a rate of displacement of the throttle plate varies during input member movement for use with the first engine or is alternatively connectable with the input member such that the displacement rate is generally constant during input member movement for use with the second engine.

In yet another aspect, an actuator for an engine of a vehicle, the engine including a carburetor having a throttle plate moveable between a minimum open position and a maximum open position. The actuator comprises an input lever pivotally connected with the vehicle so as to be angularly displaceable about an axis and having a portion engageable by a vehicle user. A control lever is pivotally connected with the vehicle so as to be angularly displaceable about the axis and engageable with the input lever such that displacement of the input lever angularly displaces the control lever. A flexible connector has a first end connected with the throttle plate and a second end connected with the control lever such that angular displacement of the control lever displaces the connector. The input lever is disengageable from the control lever such that the input lever is angularly displaceable independently of the control lever.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
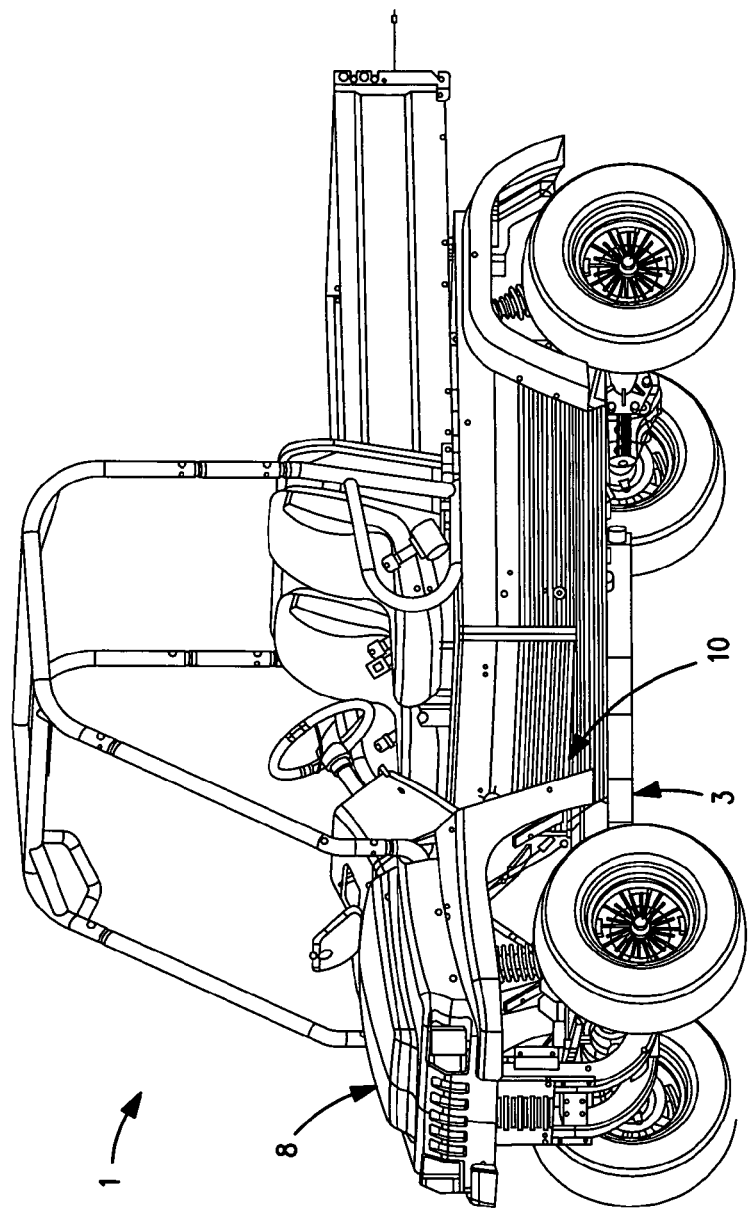
FIG. 1 is a perspective view of a vehicle having a throttle actuator in accordance with a first preferred construction of a preferred embodiment of the present invention.

Certain terminology is used in the following description for convenience only and is not limiting. The words "right", "left", "lower", "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. The terminology includes the words specifically mentioned above, derivatives thereof, and words or similar import.

Figure 2:
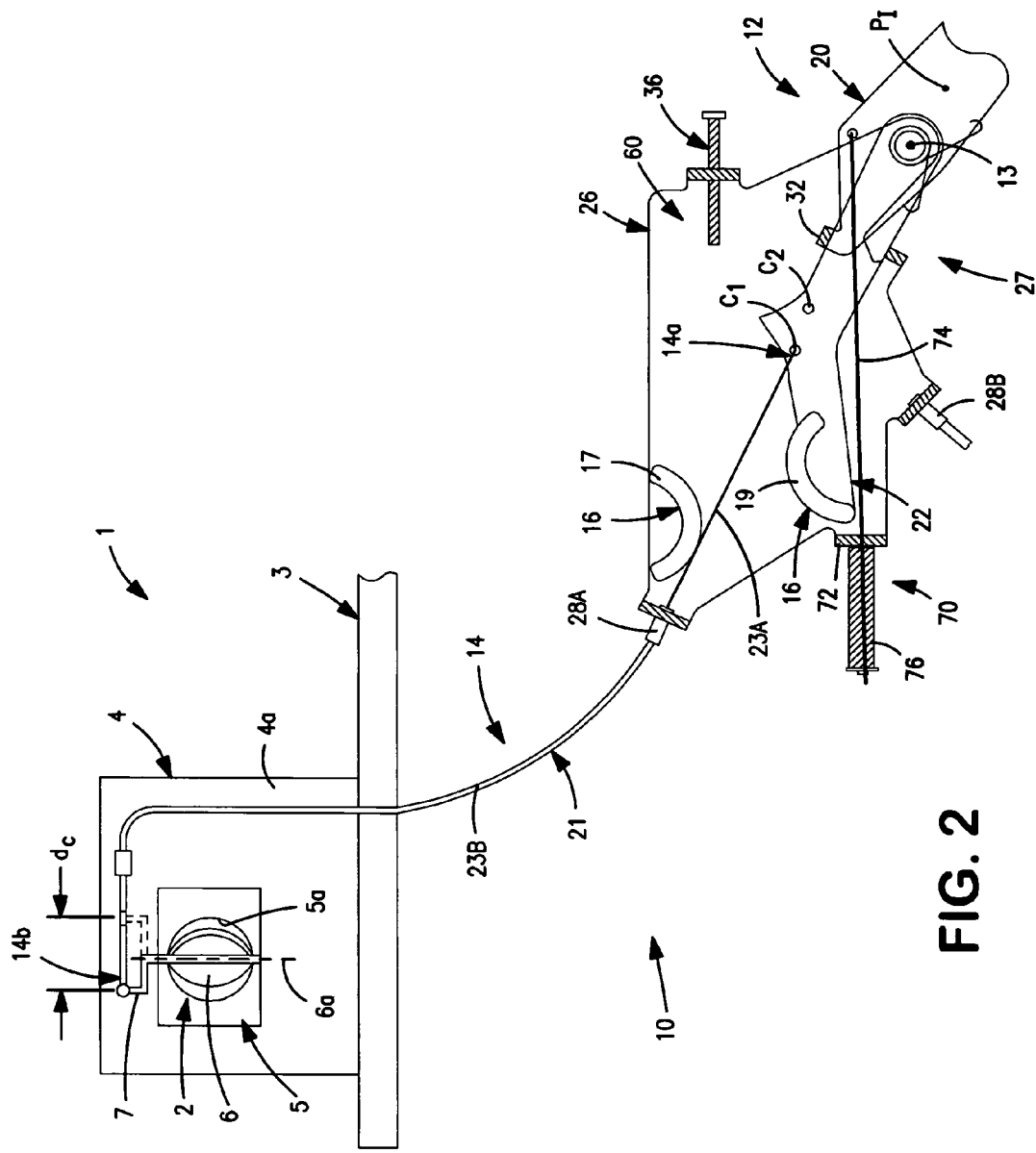
FIG. 2 is a more diagrammatic view of the first construction throttle actuator operatively connected with a throttle of the vehicle.
Figure 12:
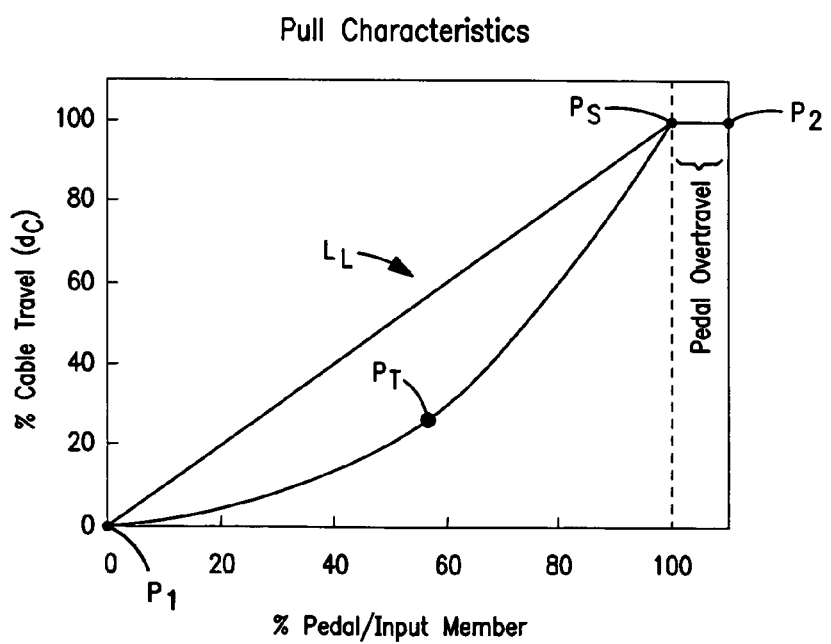
FIG. 12 is a graph depicting the "pull characteristic" or relationship between displacement of the pedal and displacement of a connector control end.
Figure 13:
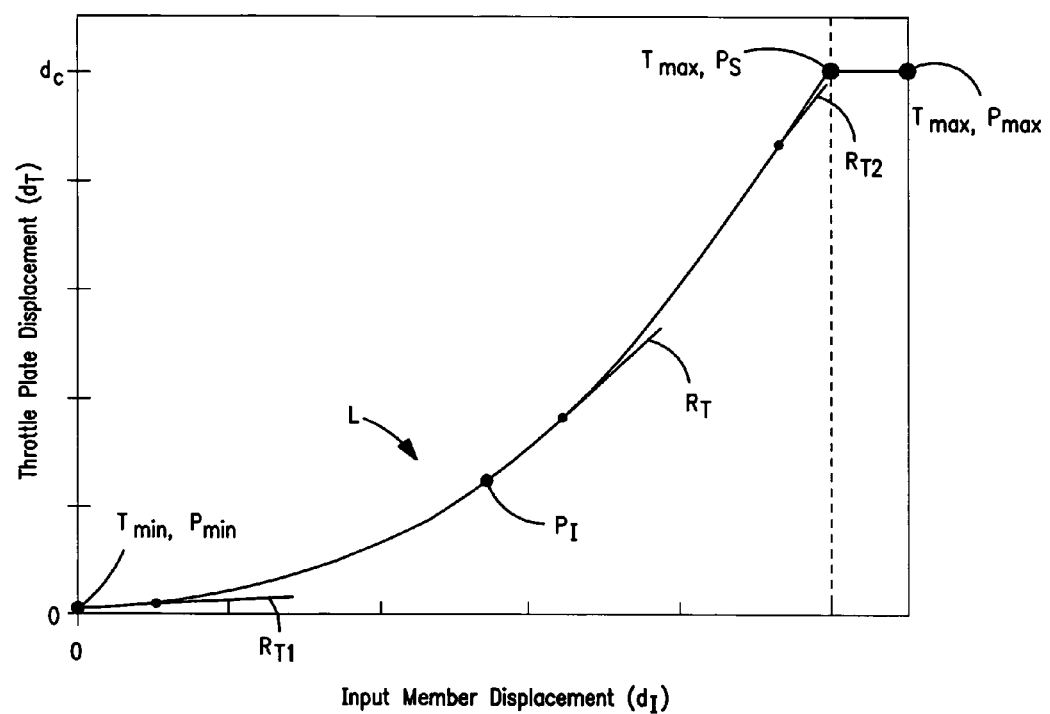
FIG. 13 is a graph depicting the non-linear relationship between throttle plate displacement and input member displacement of the throttle actuator.

Referring now to the drawings in detail, wherein like numbers are used to indicate like elements throughout, there is shown in FIGS. 1–19 a preferred embodiment of an actuator 10 for an engine throttle 2 of a vehicle 1, in accordance with the present invention. The vehicle 1 is preferably a golf car or utility vehicle that includes a frame 3 and an engine 4 mounted to the frame 3, the engine 4 having a carburetor 5 that includes the throttle 2. The throttle 2 preferably includes a pivotable valve plate 6 that is angularly displaceable about an axis 6a between a minimum open position $T_{MIN}$ and a maximum open position $T_{MAX}$ (as indicated in FIG. 13) so as to vary air flow through the carburetor opening 5a, and a lever 7 operatively connected with the plate 6. The actuator 10 basically comprises an input member 12, a flexible connector 14 and a guide 16. The input member 12, which is preferably a pedal assembly 27 as described below, is movably coupled with the vehicle 1 so as to be displaceable between an initial position $P_1$ (FIGS. 2, 3 and 5) and a maximum displaced position $P_M$ (FIG. 8), the pedal positions "P" being indicated in the drawing figures with reference to a particular point on the input member 12 that has been selected for convenience only. The flexible connector 14 has a first, "attachment" end 14a connected with the input member 12 and a second, "control" end 14b connected with the throttle plate 6, preferably through the lever 7 as shown in FIG. 2. The connector second end 14b may be directly attached to the throttle lever 7, or other component/mechanism for displacing the throttle plate 6 within the opening 5a, or may be indirectly connected through an intermediate linkage or mechanism, such as for example, a speed governor mechanism 9, as shown in FIG. 20 and described below. In either case, movement of the input member 12 displaces or "pulls" the connector 14 so that the connector control end 14b displaces or moves the throttle plate 6 between the minimum and maximum positions $T_{MIN}$, $T_{MAX}$.

Further, the guide 16 is configured to direct movement of the connector 14 such that a rate of displacement $R_T$ (FIG. 13) of the throttle plate 6 is varied as the input member 12 moves between the initial and maximum positions $P_1$, $P_M$. More specifically, the throttle displacement rate $R_T$ is an amount of displacement $d_T$ of the throttle plate 6 for an amount of input member displacement $d_I$, as graphically depicted in FIG. 13. That is, the throttle displacement rate $R_T$ may be indicated by the slope of the curvilinear function L (FIG. 13) showing the relationship between the throttle displacement $d_T$ and the input member displacement $d_I$. The guide 16 is configured such that the displacement rate $R_T$ increases in a substantially nonlinear manner as the input member displaces in a direction from the initial position $P_1$ and toward the maximum displaced position $P_M$, as indicated in FIGS. 12 and 13. As such, the value (e.g., $R_{T1}$) of the displacement rate $R_T$ when the input member 12 is located generally proximal to the maximum displaced position $P_M$ is greater than the value (e.g., $R_{T2}$) displacement rate $R_T$ when the input member 12 is located generally proximal to the initial position $P_1$. However, the connector first end 14a is preferably alternatively connectable with the input member 12 so as to be nonengageable by the guide 16 such that the throttle rate displacement $R_T$ is generally constant or "linear" as the input member 12 moves between the initial and maximum displaced positions $P_1$, $P_M$, as indicated by line $L_L$ in FIG. 12 and discussed in detail below.

Figure 8:
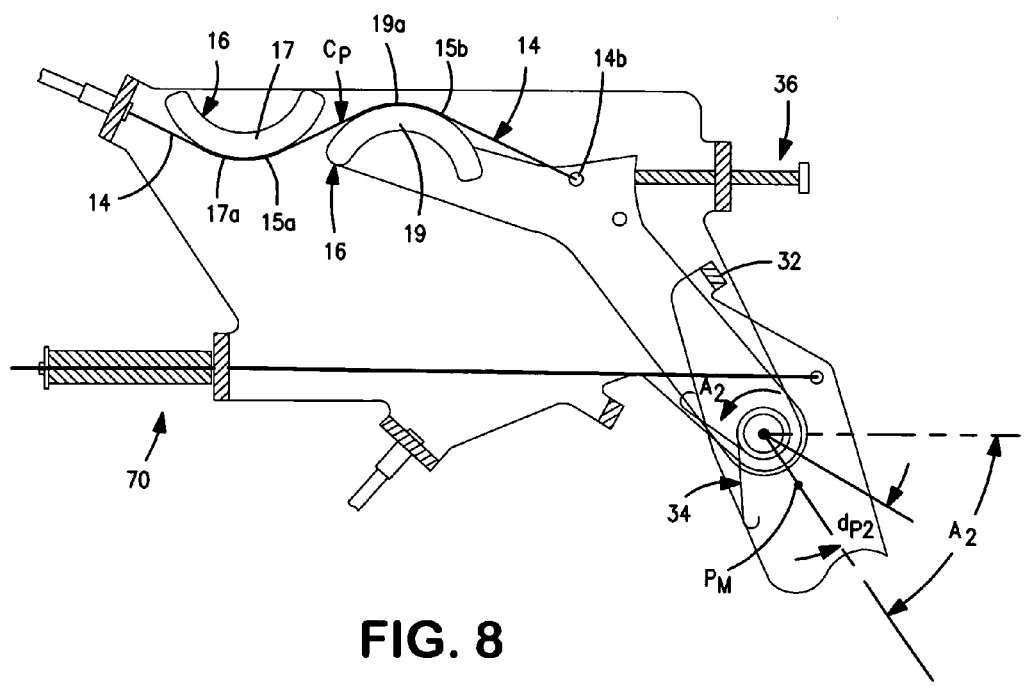
FIG. 8 is another view of the actuator of FIG. 5, showing the pedal in a second, maximum travel limit position.
Figure 9:
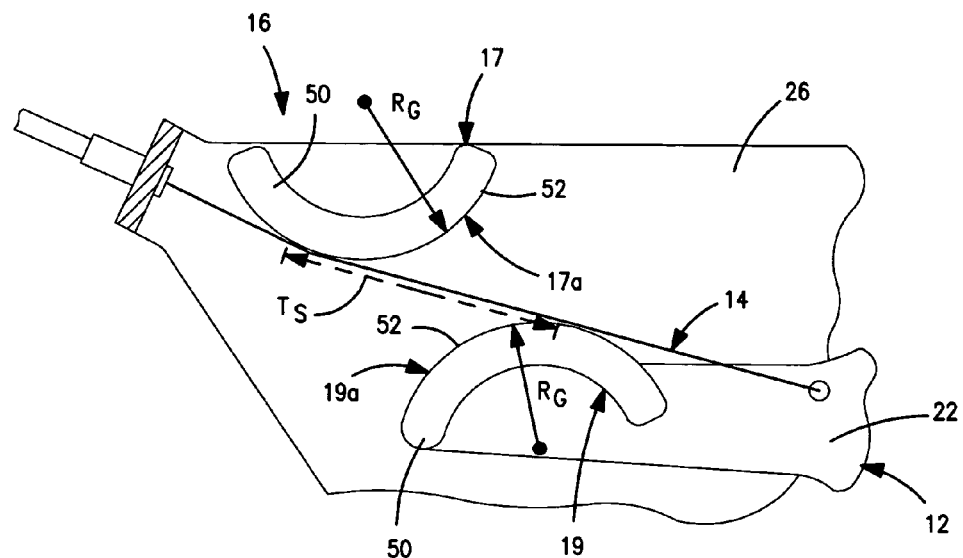
FIG. 9 is a greatly enlarged, broken-away view of the interaction between a connector and the guide members at the connector take-up position.
Figure 10:
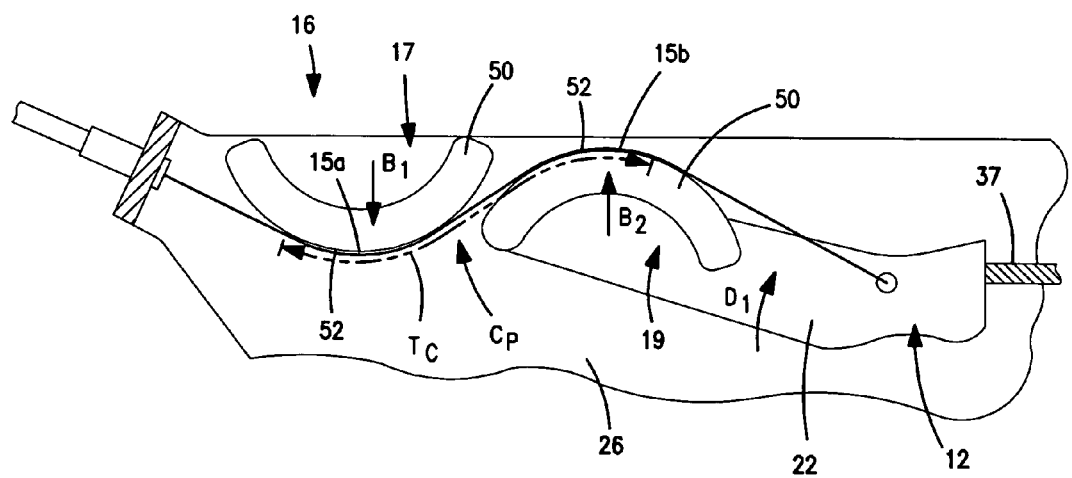
FIG. 10 is a greatly enlarged, broken-away view of the interaction between the connector and the guide members at the connector stop position.
Figure 19:
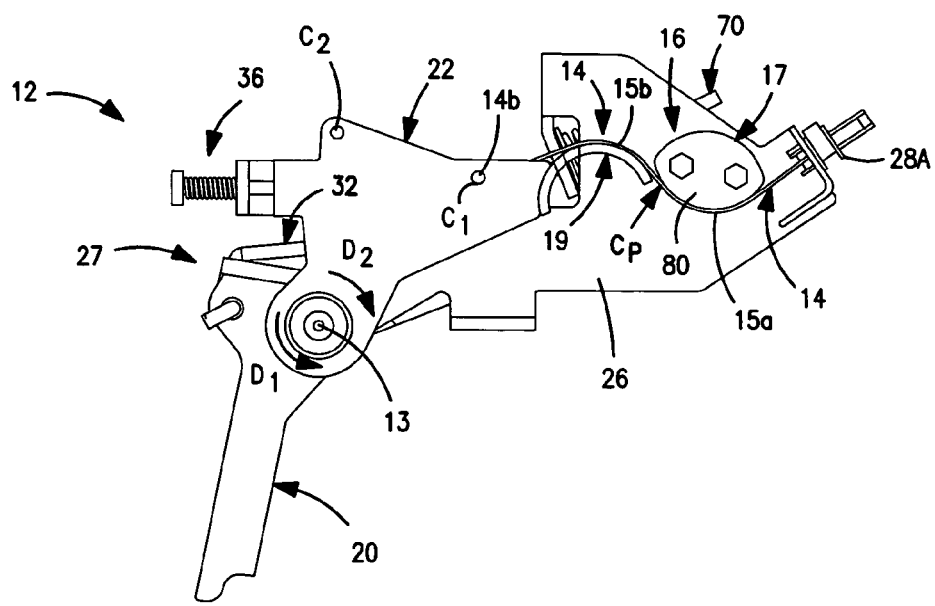
FIG. 19 is another view of the actuator of FIG. 18, showing the pedal in a second, maximum travel limit position.
Figure 20:
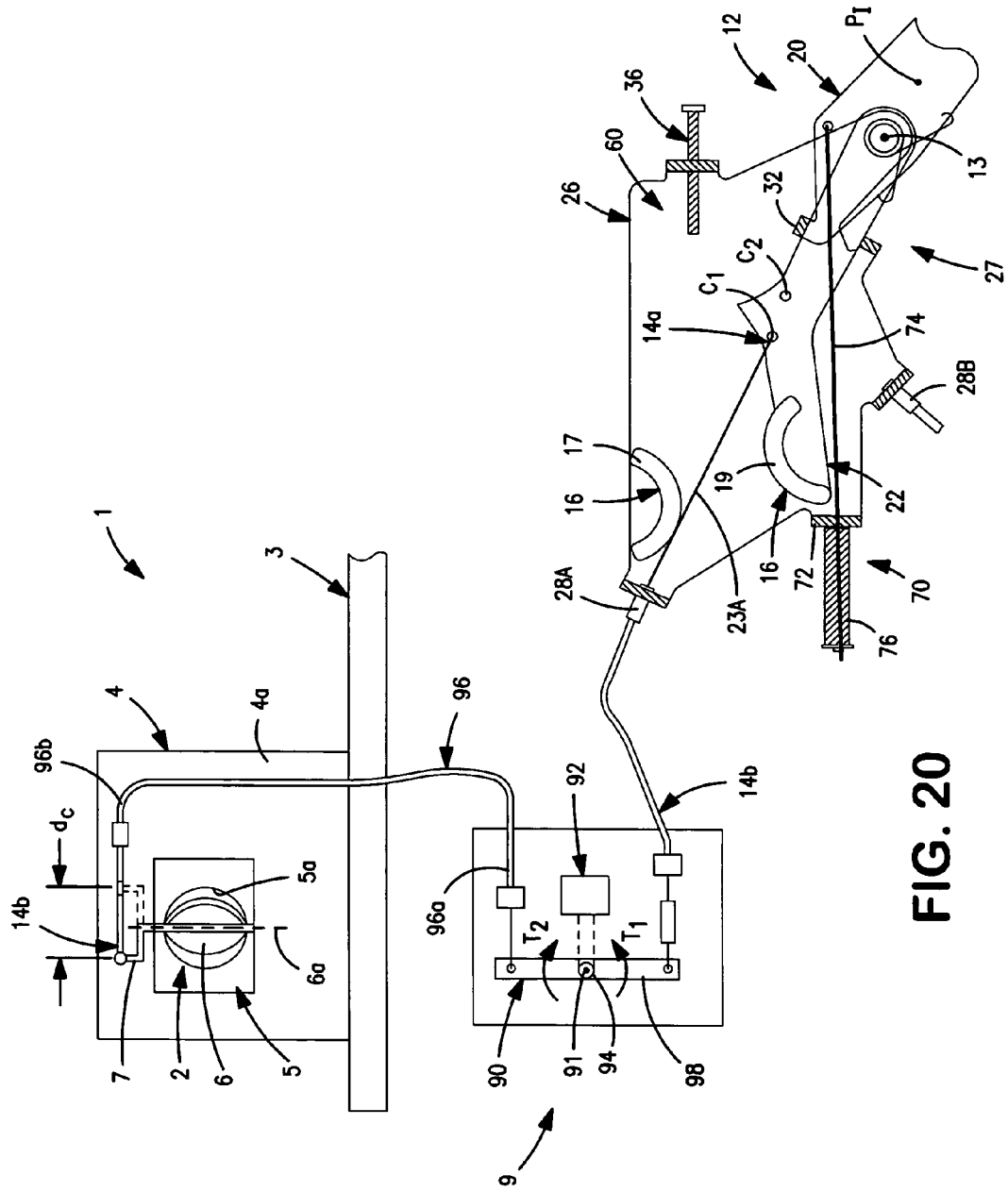
FIG. 20 is a more diagrammatic view of a second, alternative embodiment of the actuator of the present invention, which is connected with the throttle plate through a speed governor mechanism.

Referring to FIGS. 9, 10 and 19, the guide 16 is configured to take up a "central" portion $C_P$ of the connector 14 (i.e., a portion or section located between the two ends 14a, 14b) such that displacement of the connector second end 14b, connected with the throttle plate 6, is substantially greater than displacement of the connector first end 14a, connected with the input member 12, as the input member 12 moves in a first direction $D_1$ toward the maximum displaced position $P_M$. Thus, once the connector portion $C_P$ is disposed upon or winded about the guide 16 (see, e.g., FIGS. 7, 8 10 and 19), the throttle plate 6 displaces a greater distance or amount $d_T$, specifically an angular displacement about axis 6a, for a given amount of input member displacement $d_I$. Preferably, the guide 16 includes first and second guide members 17, 19, respectively, each having a contact surface 17a, 19a, respectively, and the connector 14 extends or is disposed generally between the two guide members 17, 19. The connector 14 is disposed upon at least a portion of one of the two guide member contact surfaces 17a, 19a as the input member 12 moves between the initial and maximum displaced positions $P_1$, $P_M$. Further, the two guide members 17, 19 are each configured to engage with the connector 14 such that the central portion $C_P$ of the connector 14 winds partially about each one of the two guide members 17, 19, thereby "taking up" the connector portion $C_P$, as discussed above and in further detail below.

Preferably, the first guide member 17 is fixedly connected with the vehicle 1, preferably through a base 26 as described below, and the second guide member 19 is coupled with the input member 12 so as to be displaceable with respect to the first member 17. The two guide members 17, 19 are spaced apart and engage with opposing sides of the connector 14 when the input member 12 displaces between an intermediate, or "take-up" position $P_T$ (FIG. 6) and the maximum displaced position $P_M$. In other words, as the input member 12 (and thus the second guide member 19) displaces in the first direction $D_1$ from the initial position $P_1$ and toward the maximum position $P_M$, the connector 14 slides upon at least a portion of the first guide member contact surface 17a and remains generally spaced from the second guide member 19 until the input member 12 reaches the take-up position $P_T$. At this point, separate sections 15a, 15b of the connector 14 (i.e., of the central portion $C_P$) contact, or are contacted by, each one of the two guide members 17, 19 when the input member 12 reaches or is located at the take-up position $P_T$.

During further movement of the input member 12 toward the maximum position $P_M$, a first section 15a of the connector central portion $C_P$ slides upon the first guide member contact surface 17a and a second section 15b of the connector portion $C_P$ extends about the second guide member contact surface 19a. Specifically, such continued movement of the input member 12 toward the maximum position $P_M$ causes the first and second guide members 17, 19 to push/pull the sections 15a, 15b of the connector 14 in generally opposing directions $B_1$, $B_2$ (see FIG. 10) such that the central connector portion $C_P$ winds or extends partially about each one of the two guide members 17, 19. Preferably, each of the guide member contact surfaces 17a, 19a is generally curved such that engagement of the guide members 17, 19 cause the connector portion $C_P$ to bend in a first direction $B_1$ about the first member contact surface 17a and to bend in the second, opposing direction $B_2$ about the second member contact surface 19a. As such, the connector central portion $C_P$ preferably extends generally sinusoidally about the two guide members 17, 19, with the two connector sections 15a, 15b preferably curving with a radius of no less than the recommended minimum bend radius for the particular connector material (i.e., to prevent damage or premature wear). Further, while the input member 12 moves toward the maximum position $P_M$, the guide members 17, 19 gather or "draw" an increasingly larger portion of the connector 14 onto or about the guide 16. This causes an increase in the distance that the connector central portion $C_P$ must move in response to movement of the first connector end 14a. Therefore, the integrally attached connector second end 14b (and connected throttle plate 6) also moves a correspondingly greater distance or displacement $d_{C2}$ for a given distance (i.e., $d_P$) that the connector first end 14a moves during input member displacement.

Thus, the guide 16 provides the actuator 10 with a "non-linear pull characteristic", which is particularly beneficial for gasoline-fueled engines 3 as it enables the vehicle operator to have greater control over vehicle acceleration at low engine speeds and provides a more "aggressive" control over acceleration at higher vehicle speeds. In addition, the actuator 10 is preferably configured such that the connector 14 is either attachable at a first mounting point $C_1$ on the input member 12, in which case the throttle plate 6 is displaced in the described non-linear manner, and alternatively attachable at a second mounting point $C_2$ on the input member 12, at which the connector 14 displaces the throttle plate 6 in a generally linear fashion, which is beneficial for diesel engines, as discussed below. As such, the actuator 10 is preferably configured for use alternatively with vehicles 1 having gasoline engines 3, with vehicles 1 having diesel engines 3, and may even be used with vehicles 1 having any other type of "engine" that having a carburetor or throttle mechanism.

Referring to FIGS. 4–8 and 14–16, the input member 12 preferably includes a pedal assembly 27 pivotally connected with the vehicle 1 so as to angularly displace between the initial and maximum displaced positions $P_1$, $P_M$ and generally operable by a foot of a vehicle user. Alternatively, the input member pedal assembly 27 may be hand-operated or the input member 12 may be movably coupled with the vehicle 1 so as to be generally linearly displaceable between the initial and maximum positions $P_1$, $P_M$ (neither shown). Most preferably, the pedal assembly 27 includes an input lever 20 and a control lever 22 coupleable with the input lever 20, the connector 14 being attachable to the control lever 22. The input lever 20 is preferably pivotally connected with the vehicle 1 so as to be angularly displaceable about an axis 13 and has a contact portion 24 engageable by an operator's foot (or hand). The control lever 22 is also pivotally connected with the vehicle 1 so as to be angularly displaceable about the axis 13 and is coupleable with the input lever 20 such that displacement of the input lever 20 angularly displaces the control lever 22.

Since the connector 14 is preferably attached to the control lever 22, such angular displacement of the control lever 22 displaces the connector 14, and thus also the throttle plate 6. When the two levers 20, 22 are coupled, angular displacement of the input member 12 in the first direction $A_1$ displaces the throttle plate 6 so as to increase the size of the carburetor opening 5a, thereby increasing the air flow into engine 4 and engine speed. Conversely, displacement of the input member 12 in the second angular direction $A_2$ when the levers 20, 22 are movably coupled displaces the throttle plate 6 so as to decrease the size of the carburetor opening 5a, thereby decreasing the air flow into engine 4 and reducing engine speed. Further, the input lever 20 is uncoupleable from the control lever 22 such that the input lever 20 is angularly displaceable independently of the control lever 22, and thus without further displacement of the connector 14 and throttle plate 6, as discussed in further detail below.

Although the above structure is preferred, the input member 12 may be constructed in any appropriate manner as long as the actuator 10 is capable of functioning as generally described herein. For example, the input member 12 may alternatively be of one-piece construction, with a first portion engageable by a foot (or a hand) and a second, integrally connected portion to which the flexible connector 14 is attachable, formed of three or more pieces, or constructed in any other appropriate manner (no alternatives shown). The scope of the present invention encompasses these and all other appropriate input member structures, and is in no manner limited by the particular structure of the input member 12.

Figure 3:
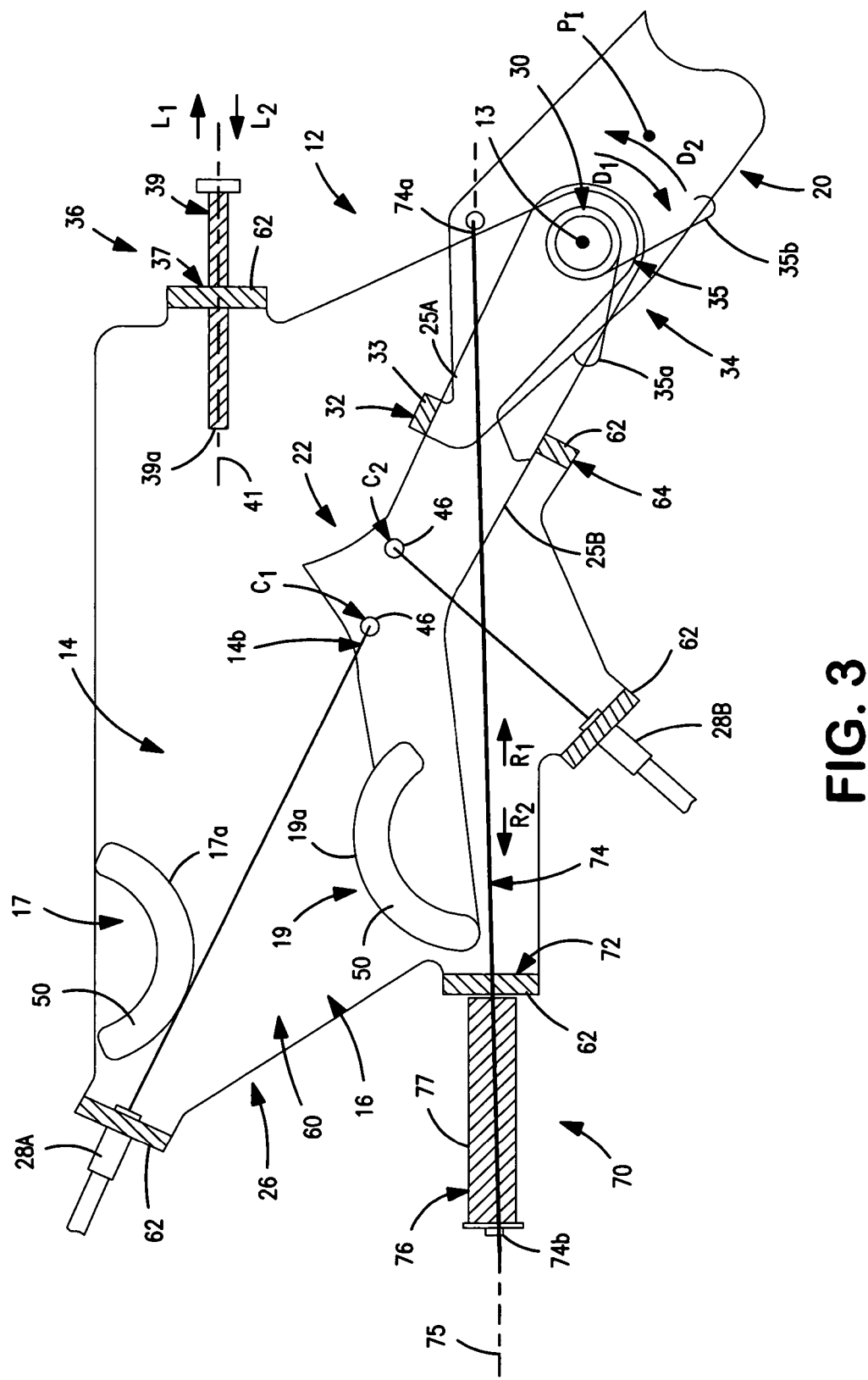
FIG. 3 is an enlarged, partly broken-away elevational view of the throttle actuator, showing a connector arranged in two potential orientations.
Figure 11:
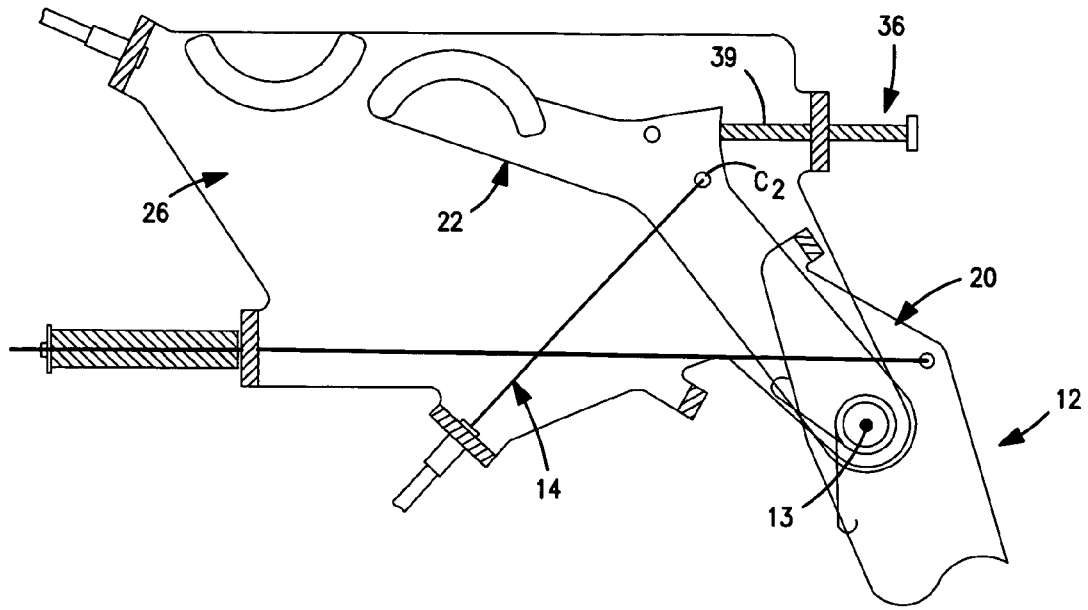
FIG. 11 is a partly broken-away, elevational view of the actuator, showing the pedal in a second limit position and the connector orientated to provide a "linear pull characteristic"
Figure 14:
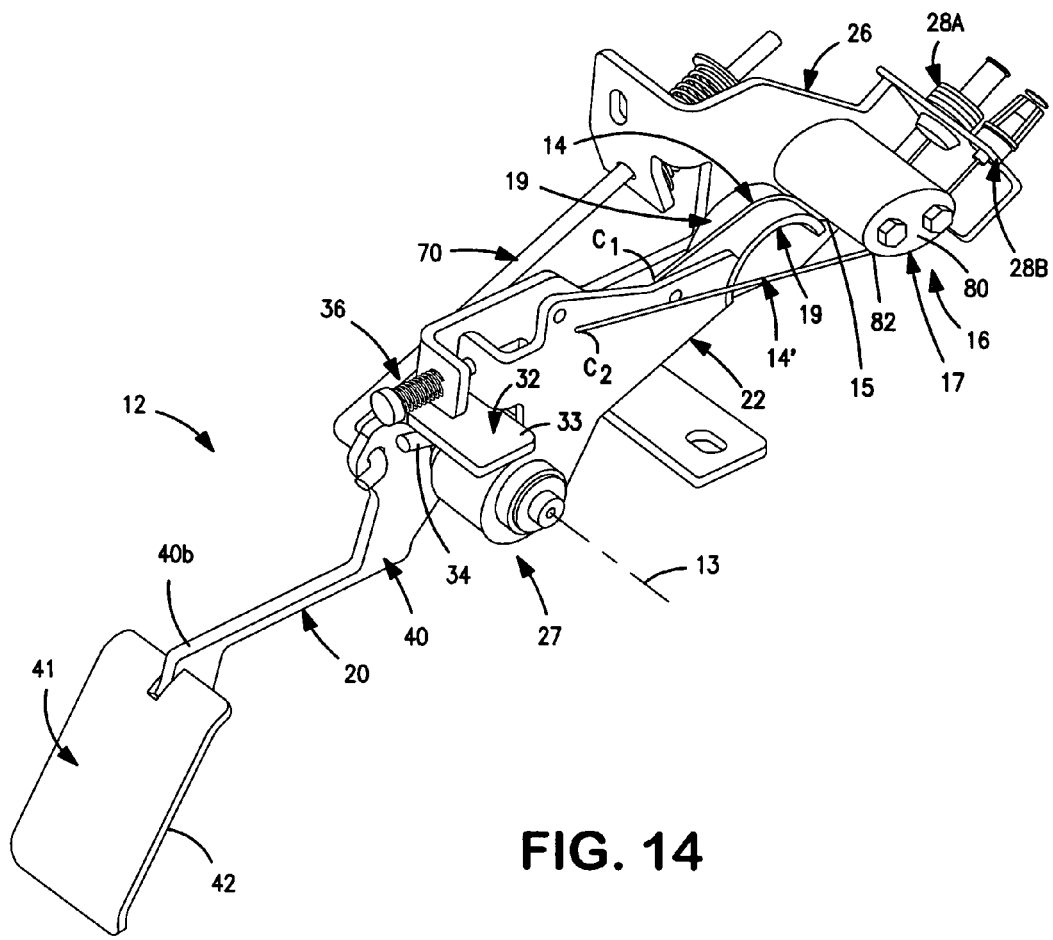
FIG. 14 is a perspective view of a second preferred construction of the preferred embodiment of the throttle actuator in accordance with the present invention.

Furthermore, the throttle actuator 10 preferably further comprises a base 26 connectable with or mountable to the vehicle 1, preferably to the vehicle frame 3 or body 8, and configured to movably support the input member 12, at least a portion of the guide 16, preferably the first guide member 17, and other actuator components as discussed below. The base 26 also preferably includes at least one and preferably two connector mounts 28A, 28B each configured to movably couple the connector 14 to the base 26 such that the connector 14 is arranged in one of two potential desired orientations with respect to the input member 12 and the guide member(s) 16. More specifically, a first connector mount 28A is located so as to direct the connector 14 to the pedal first mounting point $C_1$, as shown in FIGS. 2, 3, 5–8, 14, 18 and 19, such that the connector 14 extends generally proximal to the guide 16, specifically members 17 and 19, so as to provide the non-linear pull characteristic, as discussed above. Further, a second connector mount 28B is located so as to direct the connector 14 to the pedal second mounting point $C_2$, as shown in FIGS. 3, 11 and 14, such that the connector 14 avoids contact with the guide members 17, 19 at all positions of the input member 12 and provides the linear pull characteristic as described above.

Alternatively, the actuator 10 may be constructed without the base 26, such that the input member 12, the guide member(s) 16, and all other components of the actuator 10 may be directly connected or mounted to any appropriate part of the vehicle 1, such as directly to the frame 3, the body 8, the engine block 4a, etc., with the connector 14 being arranged in a desired orientation by any other appropriate means.

Having described the basic elements of the present invention, these and other components of the throttle actuator of the present invention are described in further detail below.

Referring first to FIG. 2, the flexible connector 14 is preferably formed as a wire rope or cable 21 having a fixed total or overall length (not indicated). The total length of the cable 21 extends between the input member 12 and the throttle plate 6, specifically the lever 7 connected with the plate 6. Preferably, a first cable section 23A extends from one of the connector mounting points $C_1$, $C_2$ on the input member 12 to the appropriate base connector mount 28A, 28B, respectively, and a second cable section 23B extends from the particular mount 28A, 28B to the throttle lever 7. The first cable section 23A preferably provides the central connector portion $C_P$ engageable with the guide 16, and thus the two connector sections 15a, 15b as discussed above, which is preferably located generally more proximal to the connector first end 14a. However, the particular connector section Cp that engages with the guide 16 may be a more "central" portion of the cable 21 (e.g., a midportion generally equidistant from the ends 14a, 14b) or another cable portion, depending on the location of the two guide members 17, 19.

Although the connector 14 is preferably substantially flexible along its entire length, the connector 14 may alternatively be formed with the second section 23B being generally rigid, for example as a connector rod (not shown) attached to the flexible first section 23A, since only the first section 23A interacts with the guide 16, as discussed above and in further detail below. In addition, the flexible connector 14 may be formed in any other appropriate manner that enables the throttle actuator 10 to function generally as described herein, such as for example, a highly flexible elastic rod, etc.

Referring now to FIGS. 2–8, 14–16, 18 and 19, as discussed above, the input member 12 is preferably constructed of two main pieces or components, specifically the input lever 20 and the control lever 22. The input member 12 is preferably angularly displaceable about the axis 13, but may alternatively be constructed so as to be generally linearly displaceable with respect to the vehicle 1 (structure not shown), as mentioned above. Further, the input member 12 preferably includes a shaft 30 connected with the preferred base 26, the two levers 20, 22 being disposed upon the shaft 30 to pivotally connect the levers 20, 22 with the base 26, and thus with the vehicle 1. Further, the input lever 20 preferably further has a stop portion 32 and the input member 12 further includes a biasing member 34 configured to bias the control lever 22 into contact with the stop portion 32 so as to releasably couple the two levers 20, 22.

Figure 4:
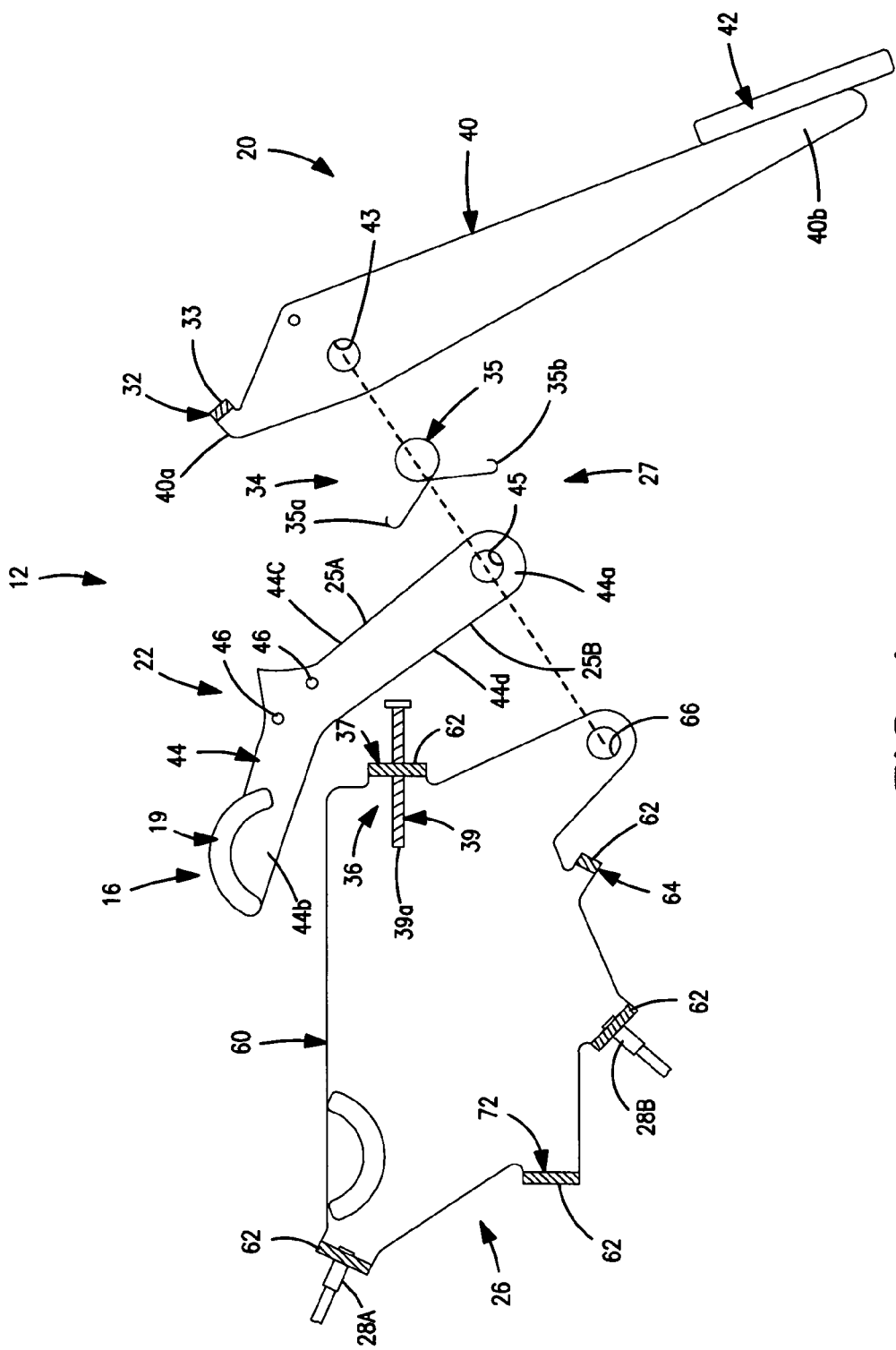
FIG. 4 is an exploded view of a pedal, guide members and base of the actuator.
Figure 5:
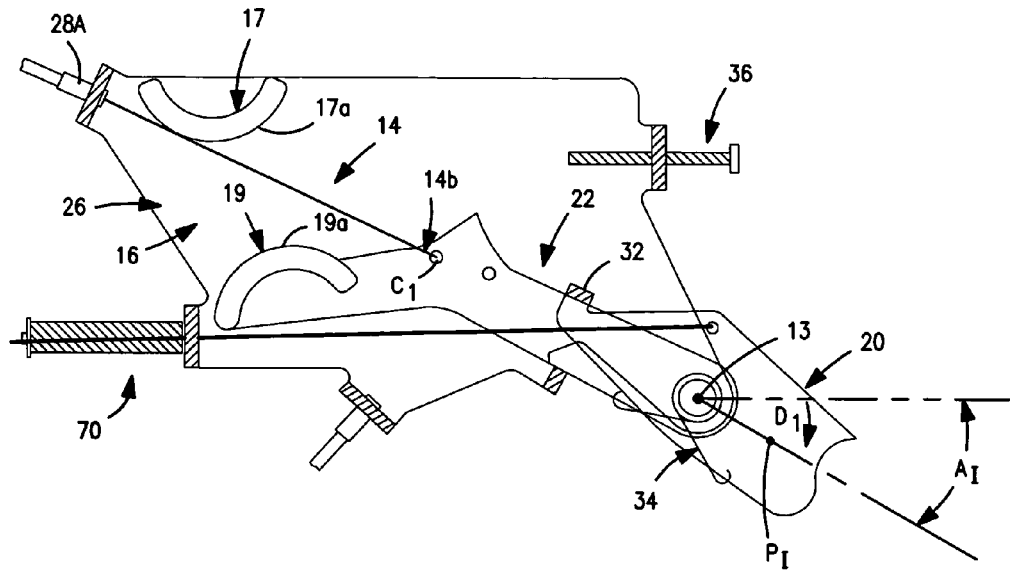
FIG. 5 is an partly broken-away, elevational view of the actuator, showing the pedal in a first, initial limit position.
Figure 6:
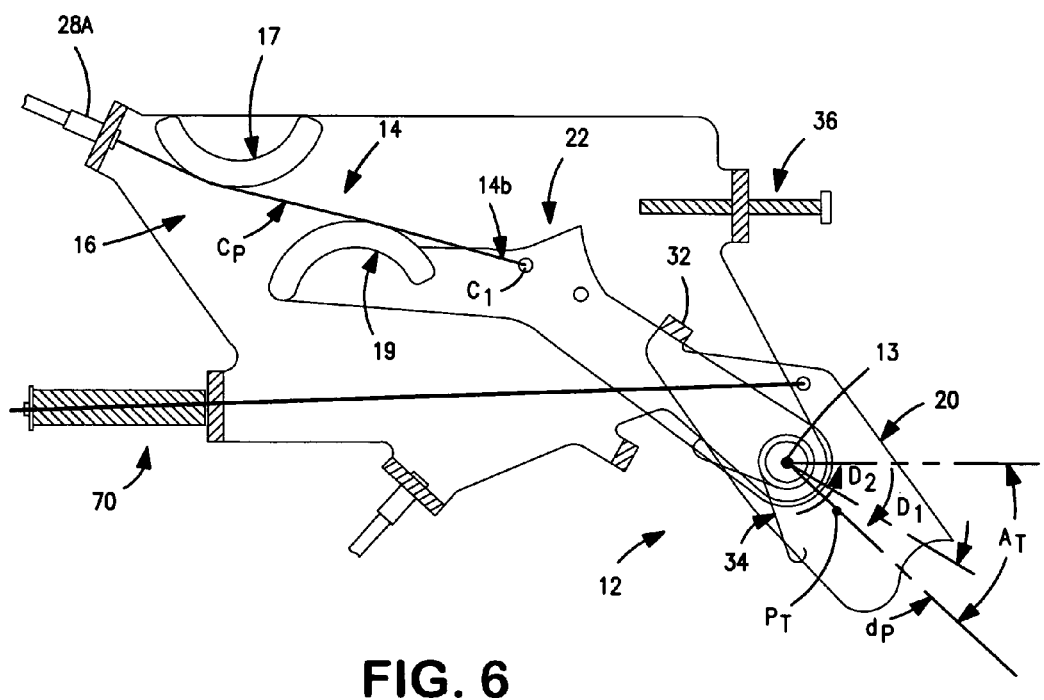
FIG. 6 is another view of the actuator of FIG. 5, showing the pedal in an intermediate, "take-up" position.

More specifically, the input lever stop portion 32 is preferably formed as a tab 33 extending from a remainder of the input lever 20 (described in further detail below) so as to extend generally along the axis 13 toward the control lever 22. Referring to FIGS. 3 and 4, the biasing member 34 is preferably a torsion spring 35 disposed about the shaft 30 and having a first end 35a disposed on the control lever 22 and a second end 35b disposed on the input lever 20. The torsion spring 35 is arranged such that a moment biases each lever 20, 22 toward the other lever 22, 20, such that an contact surface 25A of the control lever 22 is "pushed" against the input lever stop portion 32 and thus coupling the two levers 20, 22. As such, angular displacement $d_P$ of the input lever 20 about the pivot axis 13 causes a substantially equal angular displacement of the control lever 22 about the axis 13 for at least a portion of the total angular displacement between the first and second limit positions $P_1$, $P_2$, as discussed below.

Figure 7:
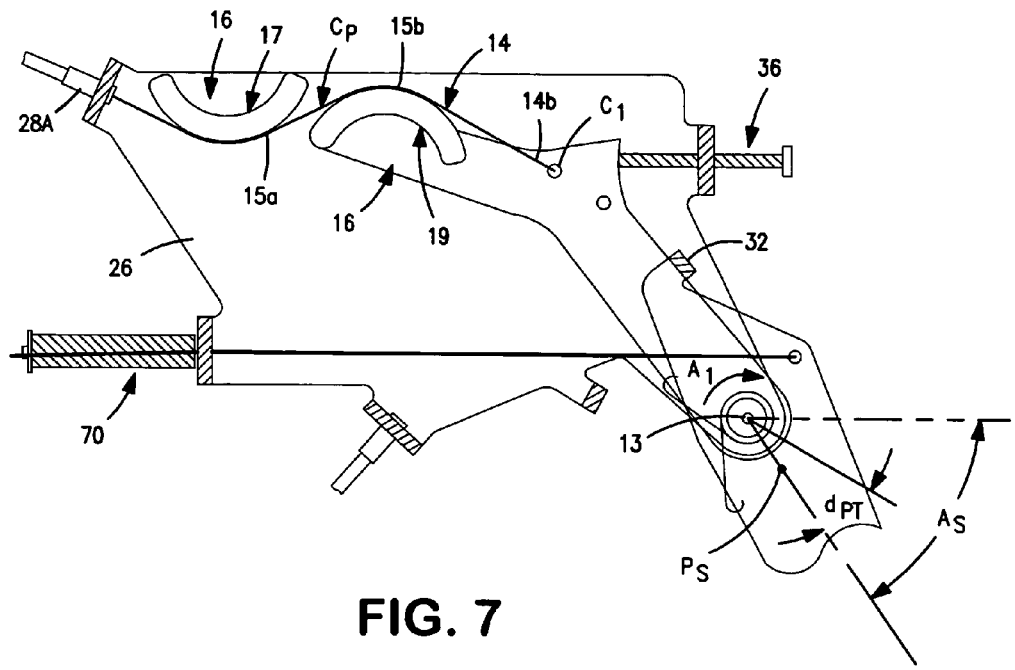
FIG. 7 is another view of the actuator of FIG. 5, showing the pedal in an intermediate, "stop" position.

Further, the actuator 10 also preferably comprises a limit assembly 36, most preferably connected with the base 26, that is contactable with the control lever 22 so as to prevent further rotation of the control lever 22 in the first angular direction $A_1$. More specifically, the control lever 22 contacts the limit assembly 36 when the coupled levers 20, 22 are located at an intermediate, stop position $P_S$ between the two "limit" (i.e., initial and maximum displaced) positions $P_1$, $P_M$, as shown in FIG. 7. As such, further displacement of the input lever 20 in the first direction $A_1$ causes the input lever 20 to uncouple from, or move independently of, the control lever 22. The input lever 20 is thereafter displaceable from the stop position $P_S$ to the second, limit position $P_2$, against the biasing action of the torsion spring 35, as the control lever 22 remains disposed against the limit assembly 36, as shown in FIG. 8.

Preferably, the limit assembly 36 is adjustable to vary the specific angular location of the stop position $P_S$ (i.e., about the pivot axis 13). Referring particularly to FIG. 3, the adjustable limit assembly 36 preferably includes a nut 37 connected with, preferably integrally formed with, the base 26 and having a threaded opening (not indicated) and an axis 41. A threaded rod 39 is threadably engaged with the nut 37 and has a contact end 39a contactable with the control lever 22. With this structure, rotation of the limit rod 39 within the nut 36 displaces the rod 39 linearly along the axis 41, thereby varying the actual angular position at which the control lever 22 contacts the rod end 39a, i.e., the stop position $P_S$. Specifically, displacing the limit rod 39 in a first axial direction $L_1$ causes the control lever 22 to be pivotable through a relatively greater angular displacement prior to the point of contact with the limit rod end 39a. Conversely, displacing the limit rod 39 in a second direction $L_2$ causes the lever 22 to be pivotable through a relatively lesser angular displacement until contact with the rod end 39a. As the connector 14 is preferably connected with the control lever 22, varying the stop position $P_S$ functions to vary the maximum open position of the throttle plate 6, and thus maximum size of the carburetor opening 5a and maximum engine speed.

Figure 15:
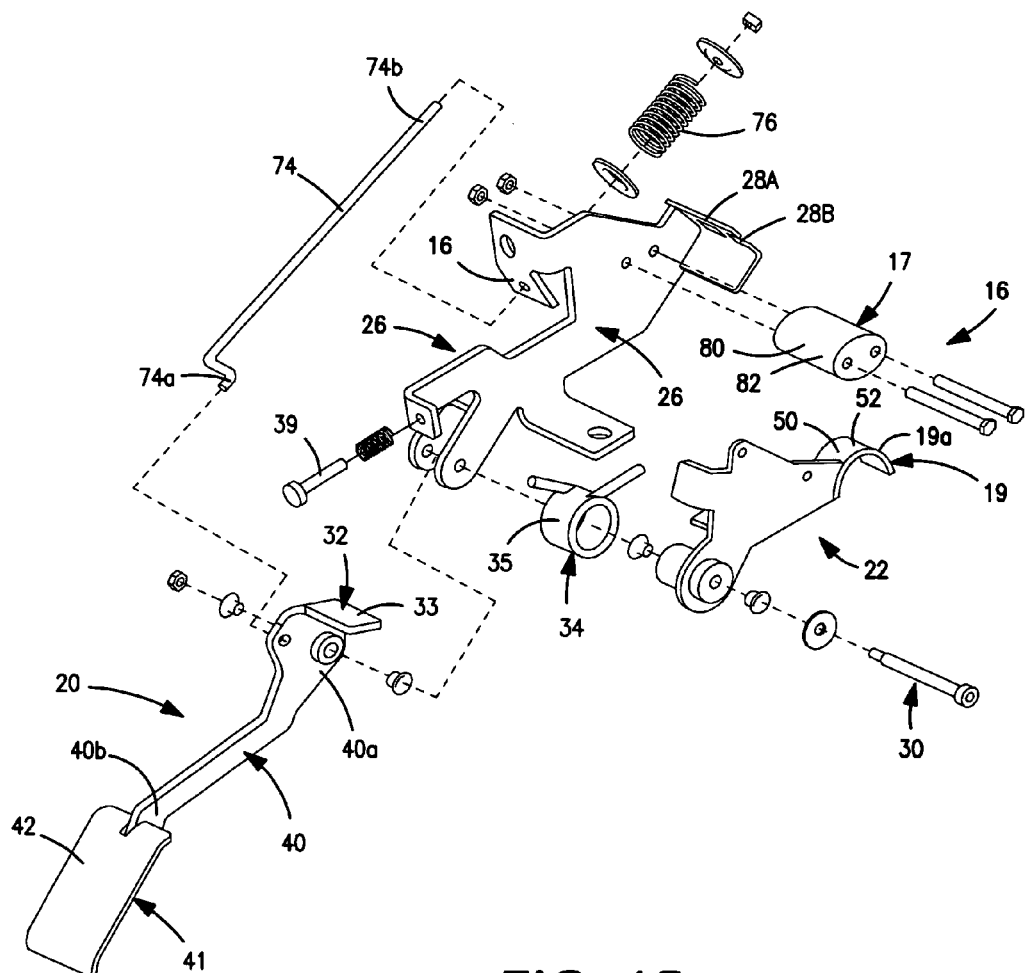
FIG. 15 is an exploded view of the second construction throttle actuator.
Figure 16:
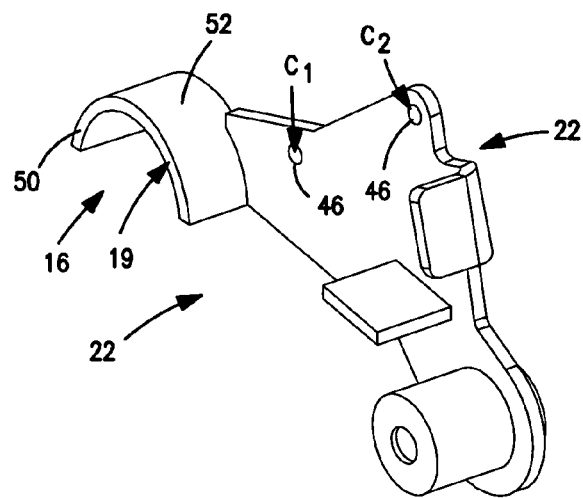
FIG. 16 is an enlarged perspective view of the control lever of the second construction throttle actuator.

Referring particularly to FIGS. 4 and 15, the input lever 20 preferably includes an elongated plate 40 having an inner end 40a and an outer end 40b, and a user engagement portion 41, preferably a foot pad 42, attached to the plate outer end 40b. The tab 33 providing the stop portion 32 is preferably disposed proximal to the plate inner end 40a and is preferably provided by an integral, bended portion of the plate 40, but may alternatively be provided by a separate, attached piece. Further, the foot lever plate 40 also has a pivot opening 43 disposed generally between the two ends 40a, 40b, preferably more proximal to the inner end 40a than to the outer end 40b, that is sized to receive the pedal shaft 30 so as to pivotally connect the input lever 20 with the base 26.

Furthermore, the control lever 22 is preferably constructed as an elongated plate 44 that is preferably sized relatively shorter than the foot lever plate 40 and has an inner end 44a and an outer end 44b. The control lever plate 44 has a pivot opening pivot 45 disposed proximal to the plate inner end 44a and sized to receive the pedal shaft 30 so as to pivotally connect the control lever 22 with the base 26. As discussed above, the control lever 22 preferably includes the movable guide member 19, as discussed above and described in detail below, which is preferably disposed proximal to the plate outer end 44b. Further, the control lever plate 44 also has a first side edge 44c providing the contact surface 25A disposeable against the input lever stop portion 32, as discussed above, and an opposing, second side edge 44d providing another contact surface 25B, for reasons discussed below. Furthermore, the control lever 22 also preferably includes at least one and preferably two attachment portions 46 disposed generally centrally between the plate ends 44a, 44b and each configured to attach the connector first or attachment end 14a with the input member 12 at the two alternative locations $C_1$, $C_2$, as discussed above. Preferably, each attachment portion 46 is provided by a separate hole configured to receive and retain an end of the preferred cable 21, but may include attachment peg, a clamp or any other component capable of retaining the connector end 14a.

Referring to FIGS. 2–11, 14–16, 18 and 19, as discussed above, the guide 16 preferably includes two guide members 17, 19, and most preferably a first, fixed guide member 17 connected with the base 26 and a second, movable guide member 19 connected with the input member 12, specifically with the control lever 22. Alternatively, the guide 16 may be constructed having only the fixed guide member 17, having only the movable guide member 19, or with three or more guide members (no alternatives shown).

Each guide member 17, 19 preferably includes either a generally arcuate body 50, as shown in FIGS. 2–11, 14–16, 18 and 19, or a generally cylindrical body 80, as depicted in FIGS. 14–16, 18 and 19 for the first guide member 17. However, either or both guide members 17, 19 may include a tubular body (not shown), a pin or any other appropriate structure capable of providing one of the contact surfaces 17a, 19a, as described above and in further detail below.

Further, each guide member body 50, 80 preferably has a generally curved contact surface 52, 82, respectively, the taken-up connector sections 15a, 15b being extendable across each contact surface 52 and/or 82. More specifically, a first taken-up connector section 15a slides along the contact surface 52 or 82 of the fixed guide member 17 and a second taken-up section 15b becomes disposed or "wrapped" about the contact surface 52 of the movable guide member 19, as indicated in FIGS. 9, 10, 18 and 19. Further, the guide members 17, 19 are each formed or constructed such that the contact surface 52, 82 has a radius $R_G$ (see FIGS. 9 and 18) that is equal to or greater than a minimum bend radius of the preferred connector cable 21, so as to minimize the potential of a premature fatigue failure of the connector 14.

Referring particularly to FIGS. 9, 10, 18 and 19, the preferred fixed guide member 17 and movable guide member 19 are preferably arranged on the base 26 and the control lever 22, respectively, such that the two contact surfaces 52, or surfaces 52 and 82, are generally facing and spaced apart laterally when the control lever 22 angularly displaces between the take-up position $P_T$ (FIG. 9) and the stop position $P_S$ (FIGS. 10 and 19). With this arrangement, the two facing, spaced-apart curved contact surfaces 52, or surfaces 52 and 82, force the taken-up connector sections 15a, 15b to travel along, or be arranged on, a curved, generally "S" shaped track or path $T_C$ (see FIGS. 10 and 19), as opposed to the straight path $T_S$ (shown in FIG. 9) that the connector 14 displaces along just prior to contact with the guide members 17, 19. By being forced along the curved, generally sinusoidal path $T_C$, the central portion $C_P$ of the connector 14 becomes disposed or located in the region about the guide members 17, 19 as the connector 16 traverses generally between the throttle plate 6 and the input member 12. As the connector 14 has a fixed length, the portion $C_P$ of the connector 14 taken up by the two guide members 17, 19 causes the displacement $d_C$ of the connector second, control end 14b, and thus the throttle plate 6, to increase for a given angular displacement $d_P$ of the input member 12 between the take-up and stop positions $P_T$, $P_S$, as compared with the control end displacement $d_C$ occurring as the input member 12 displaces between the initial position $P_1$ and the take-up position $P_T$. Although preferably formed as described above, the scope of the present invention encompasses any appropriate structure(s) of the guide 16 and/or guide members 17, 19 which provide the actuator 10 with a non-linear pull characteristic.

Referring now to FIGS. 2–4, the base 26 is preferably formed as a generally flat plate 60 connectable with the vehicle frame 3 and having a plurality of bended tabs 62 integrally formed with a remainder of the plate 60. Two tabs 62 provide the connector mounts 28A, 28B and one tab 62 provides the limit assembly nut 37. In addition, one tab 62 provides a pedal stop 64 contactable with the input member 12, specifically with the second contact surface 25B of the control lever 22, so as to prevent further rotation of the input member 12 in the second angular direction $A_2$, and thus defining the input member or "pedal" initial position $P_1$. Further, the base plate 60 also includes a shaft opening 66 (FIG. 4) sized to receive the pivot shaft 30 as described above. Although the above structure is preferred, the base 26 may be constructed in any other appropriate manner, such as for example the base structure depicted in FIG. 16, or the actuator 10 may be constructed without the base 26.

Referring to FIGS. 2, 3 and 5–8, the actuator 10 preferably further comprises a return assembly 70 configured to bias the input member 12 toward the first, initial position $P_1$. As such, when a vehicle operator reduces pressure on or completely releases the input lever 20, the return assembly 70 angularly displaces the input member 12 toward the initial position $P_1$. Preferably, the return assembly 70 includes a bearing member 72 connected with the base 26, preferably provided by one base tab 62, a return rod 74 extending through the bearing member 72 and connected with the input member 12, and a biasing member 76 configured to bias the rod 74 generally toward the bearing member 72. More specifically, the return rod 74 has a first end 74a attached to the input lever 20, second, free end 74b and a central slide axis 75 (FIG. 3) extending between the two ends 74a, 74b. The biasing member 76 is preferably a coil spring 77 that extends between the bearing member 72 and the rod second end 74b.

With this structure, movement of the input member 12 in the first direction $A_1$ about the pivot axis 13 causes the rod 74 to displace in a first direction $R_1$ (FIG. 3) along the rod axis 75, thereby compressing the coil spring 77. When the operator releases or reduces pressure on the input member 12, the spring 77 biases the rod 74 in a second direction $R_2$ generally toward the bearing member 72, thereby pulling the input member 12 to displace in the second angular direction $A_2$ toward the initial input member position $P_1$. Although the above-described return assembly 70 is presently preferred, the actuator 10 may be provided with any other appropriate device for biasing the input member 12 back toward the initial pedal position $P_1$, such as for example, a coil spring extending between the base 26 and the input member 12, another torsion spring (not shown) disposed about the pivot shaft 30, etc (no alternatives shown).

Figure 17:
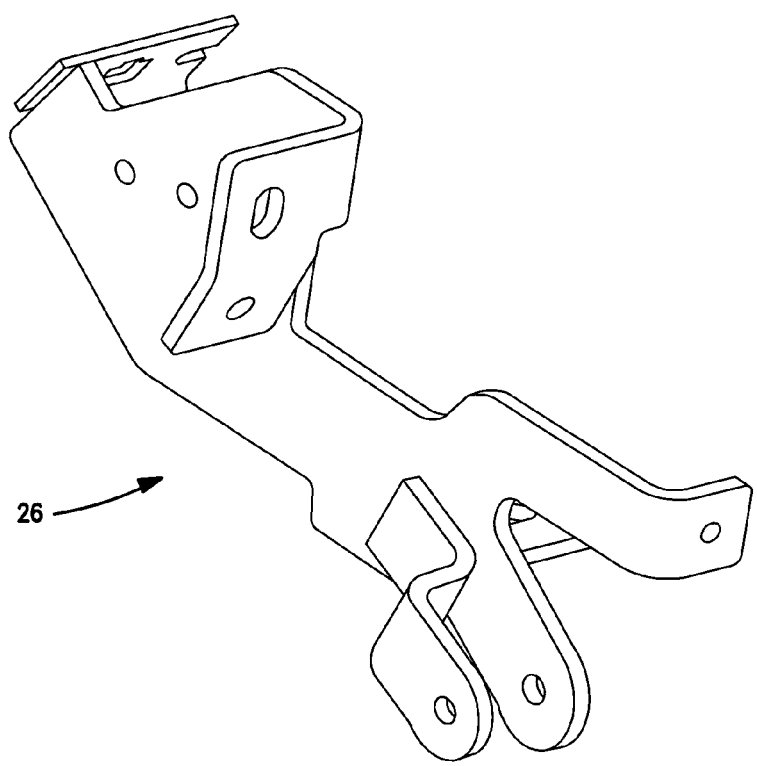
FIG. 17 is an enlarged perspective view of a base of the second construction throttle actuator.
Figure 18:
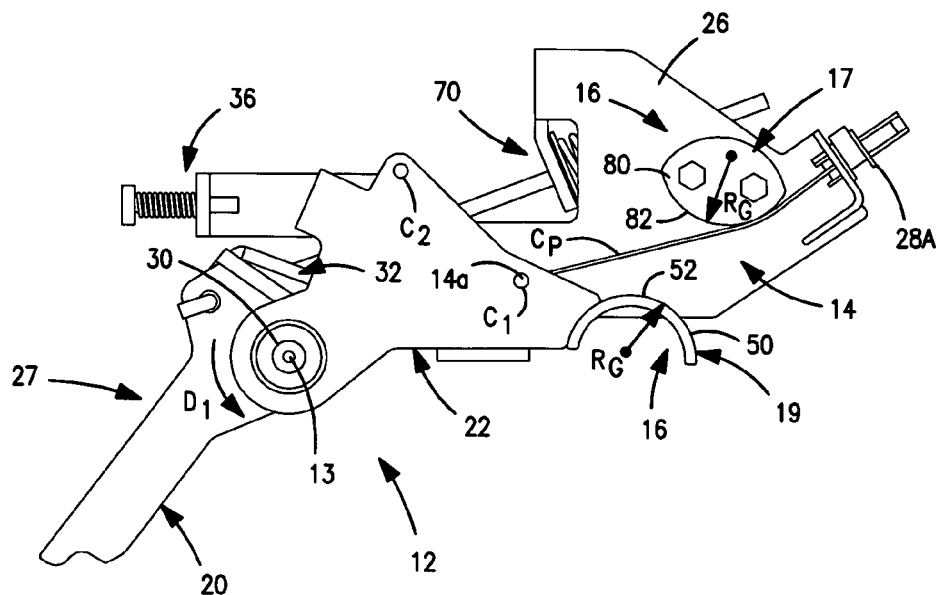
FIG. 18 is a partly broken-away, side elevational view of the second construction throttle actuator, showing the pedal in a first, limit position.

Referring to FIGS. 14–19, the second preferred construction of the actuator 10 is presently preferred over the first construction depicted in FIGS. 1–11, the first construction permitting a simplified illustration of the actuator 10 due to being of a more basic structure. However, both the first and second constructions are generally similar with the following primary differences. In the second construction, the two connector mounts 28A, 28B are located generally proximal to each other such that the connector 14, 14' extends along the fixed guide member 18 regardless of whether the actuator 10 is configured for a non-linear (connector 14) or linear pull characteristic (connector 14'), as depicted in FIG. 13. However, the connector 14 is contactable with the movable guide member 19 only when the actuator 10 is configured for the non-linear pull characteristic, as shown in FIGS. 13, 17 and 18. In addition, as described above, the fixed guide member 17 is preferably formed as a generally cylindrical block 80 having an outer circumferential contact surface 82 across which a taken-up connector section 15 is slidably displaceable.

Referring particularly to FIG. 20, in a second embodiment of the present invention, the actuator 10 is used with a vehicle 1 that further includes a governor mechanism 9 coupled with the throttle plate 6. In this embodiment, the second end 14b of the connector 14 is connected with the throttle plate 6 through both the lever 7 (as described above) and through the governor mechanism 9. In other words, the connector second end 14b is coupled with the governor mechanism 9 so as to connect the connector second end 14b with the throttle plate 6. The governor mechanism 9 is configured to displace the throttle plate 6 toward the plate minimum open position $T_{MIN}$ as a speed of the vehicle 1, either vehicle ground speed or engine speed, approaches a predetermined maximum value.

Preferably, the governor mechanism 9 includes an output member 90 rotatable about an axis 91 and coupled with the throttle plate 6 such that angular displacement of the output member 90 displaces the throttle plate 6 between the plate minimum and maximum positions $T_{MIN}$, $T_{MAX}$. The connector second end 14b is connected with the output member 90 such that movement of the input member 12 toward the input member maximum position $P_M$ applies an input torque $T_1$ on the output member 90 in a first direction about the axis 91 to move the throttle plate 6 toward the maximum position $T_{MIN}$. Further, the governor mechanism 9 is configured to apply a second torque $T_2$ on the output member 90 in a second, opposing direction about the axis 91. The governor torque $T_2$ is generally proportional to either the vehicle ground speed or the engine speed, such that as the speed increases, the governor torque prevents the connector 14 from displacing the throttle plate 6 toward the maximum open position $T_{MAX}$, thereby preventing the speed from exceeding the predetermined value.

Preferably, the governor mechanism 9 includes a speed sensor device 92 having an output shaft 94 and a flexible connector 96 having a first end 96a connected with the output member 90 and a second end 96b coupled with the throttle plate 6. The governor output member 90 is preferably a lever 98 mounted to the output shaft 94 and the axis 91 extends longitudinally through the shaft 91, such that rotation of the shaft 94 angularly displaces the lever 98 about the axis 91. Further, the speed sensor device 92 is configured sense the vehicle ground speed or engine speed and to generate and apply the governor torque $T_2$ on the output shaft 94. As such, the net torque on the shaft 94, i.e., the difference between the actuator torque $T_1$ and the governor torque $T_2$, determines the direction and extent of movement of the throttle plate 6. As such, at low vehicle or engine speed, the governor torque $T_2$ is relatively minimal such that the input member 12 moves the throttle plate 6 generally as described above with the first embodiment. However, when the ground speed or engine speed increases to a value near the predetermined value (e.g., 20 mph ground speed), the governor torque $T_2$ increases to a value equal to or greater than the actuator torque $T_1$, such that the throttle plate 6 is either moved toward the minimum open position $T_{MIN}$, or prevented from further movement toward the maximum open position $T_{MAX}$.

Furthermore, the structure of the governor 90 as described above and depicted in FIG. 20 is only one preferred construction, and is it within the scope of the present invention to construct the governor 90 in any appropriate manner. Further, the vehicle 1 may include any other component or device for connecting the actuator connector 14 with the throttle plate 6, for example, a linkage (not shown) connected with the throttle plate 6 or the throttle lever 7. The scope of the present invention includes these and any other appropriate structures for connecting the actuator connector with the throttle plate 6.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

I claim:

1. An actuator for an engine of a vehicle, the engine including a carburetor having a throttle plate moveable between a minimum open position and a maximum open position, the actuator comprising:
    an input member movably coupled with the vehicle so as to be displaceable between an initial position and a maximum displaced position;
    a flexible connector having a first end connected with the input member and a second end connected with the throttle plate such that movement of the input member displaces the connector to move the throttle plate between the minimum and maximum positions; and
    a guide configured to direct movement of the connector such that a rate of displacement of the throttle plate is varied as the input member moves between the initial and maximum positions, the guide including first and second guide members, each guide member having a contact surface, the connector being disposed generally between the two guide members such that the connector is disposed upon at least a portion of one of the two guide member contact surfaces as the input member displaces between the initial and maximum displaced positions.

2. The actuator as recited in claim 1 wherein the displacement rate is an amount of displacement of the throttle plate for an amount of input member displacement.

3. The actuator as recited in claim 2 wherein the guide is configured such that the displacement rate increases in a substantially nonlinear manner as the input member displaces in a direction from the initial position and toward the maximum displaced position.

4. The actuator as recited in claim 2 wherein the guide is configured such that the displacement rate when the input member is located generally proximal to the maximum displaced position is greater than the displacement rate when the input member is located generally proximal to the initial position.

5. The actuator as recited in claim 1 wherein the guide is configured to take up a portion of the connector such that displacement of the connector second end is substantially greater than displacement of the connector first end as the input member moves toward the maximum displaced position.

6. The actuator as recited in claim 5 wherein the first guide member is fixedly connected with the vehicle and the second guide member is coupled with the input member so as to be movable with respect to the first guide member, the two guide members engaging with a separate, opposing side of the connector when the input member displaces between an intermediate position and the maximum displaced position such that the taken-up connector portion is partially winded about each one of the first and second guide members.

7. The actuator as recited in claim 6 wherein each one of the first and second guide members has a generally curved contact surface, the two guide members being spaced apart and engaging with opposing sides of the connector such that the connector portion is bended in a first direction about the first member contact surface and is bended in an second, opposing direction about the second member contact surface such that the connector portion extends generally sinusoidally about the two guide members.

8. The actuator as recited in claim 1 wherein:
the connector slides upon at least a portion of the first guide member contact surface and remains generally spaced from the second guide member when the input member displaces between the initial position and an intermediate position; and
a first section of the connector slides upon the first guide member contact surface and a second section of the connector extends about the second guide member contact surface when the input member displaces between the intermediate and maximum displaced positions.

9. The actuator as recited in claim 8 wherein the first guide member is fixedly connected with the vehicle and the second guide member is coupled with the input member so as to be movable with respect to the first guide member, each of the two guide members engaging with the connector when the input member displaces between the intermediate and maximum displaced position so that the first connector section is partially winded about the first guide member and the second connector section is partially winded about the second guide member such that displacement of the connector second end is substantially greater than displacement of the connector first end as the input member moves toward the maximum displaced position.

10. The actuator as recited in claim 9 wherein each one of the first and second guide member contact surfaces is generally curved, the two guide members being spaced apart and engaging with opposing sides of the connector such that the first connector section is bended in a first direction about the first member contact surface and the second connector section is bended in an second, opposing direction about the second member contact surface such that the connector extends generally sinusoidally about the two guide members.

11. The actuator as recited in claim 1 wherein each guide member includes one of an arcuate plate, a tubular body and a cylindrical body.

12. The actuator as recited in claim 1 further comprising a base mountable to the vehicle, the first guide member being fixedly connected with the base and the input member being movably connected with the base.

13. The actuator as recited in claim 1 wherein the contact surface of each one of the first and second guide members extends at least partially circumferentially about a separate center, the two centers being spaced apart and the two members being arranged such that two contact surfaces are generally facing.

14. The actuator as recited in claim 1 further comprising a base mountable to the vehicle, the input member and at least a portion of the guide being connected with the base.

15. The actuator as recited in claim 1 wherein the connector includes a cable providing the connector first and second ends and having a generally fixed length between the two ends.

16. An actuator for an engine of a vehicle, the engine including a carburetor having a throttle plate moveable between a minimum open position and a maximum open position, the actuator comprising:
an input member movably coupled with the vehicle so as to be displaceable between an initial position and a maximum displaced position;
a flexible connector having a first end connected with the input member and a second end connected with the throttle plate such that movement of the input member displaces the connector to move the throttle plate between the minimum and maximum positions; and
a guide configured to direct movement of the connector such that a rate of displacement of the throttle plate is varied as the input member moves between the initial and maximum positions, wherein the guide includes a first guide member fixedly connected with the vehicle and a second guide member coupled with the input member so as to be displaceable with respect to the first guide member, the connector extending generally between the two guide members such that a portion of the connector extends partially about each one of the two guide members when the input member displaces between an intermediate position and the maximum displaced position.

17. The actuator as recited in claim 16 wherein the governor mechanism includes an output member rotatable about an axis and coupled with the throttle plate such that angular displacement of the output member displaces the throttle plate between the plate minimum and maximum positions, the connector second end being connected with the output member such that movement of the input member toward the input member maximum position applies a torque on the output member in a first direction about the axis to move the throttle plate toward the maximum position, the governor mechanism being configured to apply a torque on the output member in a second, opposing direction about the axis, the governor torque being generally proportional to one of vehicle ground speed and an engine speed.

18. The actuator as recited in claim 17 wherein the governor mechanism further includes:
a speed sensor device having an output shaft, the governor output member being mounted to shaft, the speed sensor device being configured to generate a torque on the output shaft in second direction about the axis, the speed sensor torque being proportional to one of vehicle ground speed and engine speed; and
a flexible connector having a first end connected with the output member and a second end coupled with the throttle plate.

19. An actuator for an engine of a vehicle, the engine including a carburetor having a throttle plate moveable between a minimum open position and a maximum open position, the actuator comprising:

an input member movably coupled with the vehicle so as to be displaceable between an initial position and a maximum displaced position;

a flexible connector having a first end connected with the input member and a second end connected with the throttle plate such that movement of the input member displaces the connector to move the throttle plate between the minimum and maximum positions;

a guide configured to direct movement of the connector such that a rate of displacement of the throttle plate is varied as the input member moves between the initial and maximum positions; and a governor mechanism coupled with the throttle plate, the second end of the connector being coupled with the governor mechanism so as to connect the connector second end with the throttle plate, wherein the governor mechanism is configured to displace the throttle plate toward the plate minimum open position as a speed approaches a predetermined maximum value, the speed being one of vehicle ground speed and engine speed.

20. The actuator as recited in claim 19 wherein:

the foot lever has a stop portion extending generally along the axis toward the control lever; and the actuator further comprises a biasing member is configured to bias the control lever into contact with the input lever stop portion so as to releasably couple the two levers.

21. The actuator as recited in claim 20 further comprising a limit member connected with the vehicle and contactable with the control lever so as to prevent rotation of the control lever in a first angular direction about the axis so as to limit vehicle speed.

22. The actuator as recited in claim 21 wherein the foot lever is displaceable between first and second limit positions about the axis, the control lever contacting the limit member when the foot lever is located at an intermediate, stop position between the two limit positions such that further displacement of the foot lever in the first direction causes the foot lever to uncouple from the control lever.

23. The actuator as recited in claim 22 wherein the limit member is adjustable so as to vary the location of the stop position.

24. The actuator as recited in claim 19 wherein:

the foot lever is angularly displaceable between first and second limit positions about the axis; and the actuator assembly further comprises a return member configured to bias the foot lever toward the first position.

25. An actuator for an engine of a vehicle, the engine including a carburetor having a throttle plate moveable between a minimum open position and a maximum open position, the actuator comprising:

an input member movably coupled with the vehicle so as to be displaceable between an initial position and a maximum displaced position, the input member including a pedal assembly pivotally connected with the vehicle so as to angularly displace between the initial and maximum displaced positions, the pedal assembly including an input lever pivotally connected with the vehicle so as to be angularly displaceable about an axis and having a portion contactable by a foot and a control lever pivotally connected with the vehicle so as to be angularly displaceable about the axis and engageable with the foot lever such that displacement of the foot lever angularly displaces the control lever, the foot lever being disengageable from the control lever such that the foot lever is angularly displaceable independently of the control lever;

a flexible connector having a first end connected with the control lever such that angular displacement of the control lever displaces the connector and a second end connected with the throttle plate such that movement of the input member displaces the connector to move the throttle plate between the minimum and maximum positions; and a guide configured to direct movement of the connector such that a rate of displacement of the throttle plate is varied as the input member moves between the initial and maximum positions.

26. The actuator as recited in claim 25 wherein the input member has first and second attachment portions, the connector first end being attachable to the first attachment portion when the connector is engageable by the guide and alternatively connected with the second attachment portion when the connector is nonengageable by the guide.

27. The actuator as recited in claim 26 wherein the actuator is configured for use with a first engine when engageable by the guide and is alternatively configured for use with a second engine when nonengageable by the guide.

28. An actuator for use with a first vehicle engine and alternatively with a second vehicle engine, each engine including a carburetor with a throttle plate moveable between a minimum open position and a maximum open position, the actuator comprising:

an input member movably coupled with the vehicle so as to be displaceable between an initial position and a maximum displaced position; and a flexible connector having a first end connected with the input member and a second end connected with the throttle plate such that movement of the input member displaces the connector to move the throttle plate between the minimum and maximum positions when the input member displaces between the initial and maximum positions; and wherein the connector is connectable with the input member such that a rate of displacement of the throttle plate varies during input member movement for use with the first engine and is alternatively connectable with the input member such that the displacement rate is generally constant during input member movement for use with the second engine.

29. The actuator as recited in claim 28 wherein the throttle displacement rate is an amount of displacement of the throttle plate for an amount of input member displacement.

30. The actuator as recited in claim 28 wherein the first engine is a gasoline engine and the second engine is a diesel engine.

31. The actuator as recited in claim 28 wherein the input member has first and second connector attachment point, the connector first end being connected with the first mount when the actuator is used with the first engine and alternatively connected with the second attachment point when the actuator is used with the second engine.

32. The actuator as recited in claim 31 wherein:

when the connector is connected with the first attachment point, the throttle displacement rate varies during movement of the input member; and when the connector is connected with the second attachment point, the throttle displacement rate remains generally constant during movement of the input member.

33. The actuator as recited in claim 28 further comprising a guide configured to direct movement of the connector so as to vary the throttle displacement rate, the connector being engageable by the guide when the actuator is used with the first engine and is alternatively nonengageable with the guide when the actuator is used with the second engine.

34. The actuator as recited in claim 33 wherein the guide is configured to take up a portion of the connector such that displacement of the connector second end is substantially greater than displacement of the connector first end as the input member moves toward the maximum displaced position.

35. The actuator as recited in claim 34 wherein the guide includes a first guide member fixedly connected with the vehicle and a second guide member coupled with the input member so as to be movable with respect to the first guide member, the connector extending generally between the first and second guide members, the two guide members engaging with a separate, opposing side of the connector when the input member displaces between an intermediate position and the maximum displaced position such that the taken-up connector portion is partially winded about each one of the first and second guide members.

36. The actuator as recited in claim 33 wherein the guide includes first and second guide members, each guide member having a contact surface, the connector being disposed generally between the two guide members such that the connector is disposed upon at least a portion of one of the two guide member contact surfaces as the input member displaces between the initial and maximum displaced positions.

37. The actuator as recited in claim 36 wherein:
the connector slides upon at least a portion of the first guide member contact surface and remains generally spaced from the second guide member when the input member displaces between the initial position and an intermediate position; and
a first section of the connector slides upon the first guide member contact surface and a second section of the connector extends about the second guide member contact surface when the input member displaces between the intermediate and maximum displaced positions.

38. The actuator as recited in claim 37 wherein the first guide member is fixedly connected with the vehicle and the second guide member is coupled with the input member so as to be movable with respect to the first guide member, each of the two guide members engaging with the connector when the input member displaces between the intermediate and maximum displaced position so that the first connector section is partially winded about the first guide member and the second connector section is partially winded about the second guide member such that displacement of the connector second end is substantially greater than displacement of the connector first end as the input member moves toward the maximum displaced position.

39. An actuator for an engine of a vehicle, the engine including a carburetor having a throttle plate moveable between a minimum open position and a maximum open position, the actuator comprising:
an input lever pivotally connected with the vehicle so as to be angularly displaceable about an axis and having a portion engageable by a vehicle user;
a control lever pivotally connected with the vehicle so as to be angularly displaceable about the axis and engageable with the input lever such that displacement of the input lever angularly displaces the control lever;
a flexible connector having a first end connected with the throttle plate and a second end connected with the control lever such that angular displacement of the control lever displaces the connector, the input lever being disengageable from the control lever such that the input lever is angularly displaceable independently of the control lever; and
a limit member connected with the vehicle and contactable with the control lever so as to prevent rotation of the control lever in a first angular direction about the axis;
wherein the input lever is displaceable between first and second limit positions about the axis and the control lever contacts the limit member when the input lever is located at an intermediate, stop position between the two limit positions such that further displacement of the input lever in the first direction causes the input lever to uncouple from the control lever.

40. The actuator as recited in claim 39 wherein:
the input lever has a stop portion extending generally along the axis toward the control lever; and
the actuator assembly further comprises a biasing member is configured to bias the control lever into contact with the input lever stop portion so as to releasably couple the two levers.

41. The actuator as recited in claim 39 wherein the limit member is adjustable so as to vary the location of the stop position.

42. The actuator as recited in claim 39 wherein the limit member limits throttle displacement so as to limit vehicle speed.

43. The actuator as recited in claim 39:
wherein the input lever is angularly displaceable between first and second limit positions about the axis; and
the actuator assembly further comprises a return member configured to bias the input lever toward the first position.

44. The actuator as recited in claim 39 wherein the input lever is a foot lever engageable by a foot of a vehicle user.

45. An actuator for an engine of a vehicle, the engine including a carburetor having a throttle plate moveable between a minimum open position and a maximum open position, the actuator comprising:
an input member movably coupled with the vehicle so as to be displaceable between an initial position and a maximum displaced position;
a flexible connector having a first end connected with the input member and a second end connected with the throttle plate such that movement of the input member displaces the connector to move the throttle plate between the minimum and maximum positions; and
a guide configured to direct movement of the connector such that a rate of displacement of the throttle plate is varied as the input member moves between the initial and maximum positions, the guide being further configured to take up a portion of the connector such that displacement of the connector second end is substantially greater than displacement of the connector first end as the input member moves toward the maximum displaced position, the guide including a first guide member fixedly connected with the vehicle and a second guide member coupled with the input member so as to be movable with respect to the first guide member, the connector extending generally between the first and second guide members, the two guide members engaging with a separate, opposing side of the connector when the input member displaces between an intermediate position and the maximum displaced position such that the taken-up connector portion is partially winded about each one of the first and second guide members.

46. An actuator for an engine of a vehicle, the engine including a carburetor having a throttle plate moveable between a minimum open position and a maximum open position, the actuator comprising:

an input member movably coupled with the vehicle so as to be displaceable between an initial position and a maximum displaced position;

a flexible connector having a first end connected with the input member and a second end connected with the throttle plate such that movement of the input member displaces the connector to move the throttle plate between the minimum and maximum positions; and a guide configured to direct movement of the connector such that a rate of displacement of the throttle plate is varied as the input member moves between the initial and maximum positions, wherein the guide includes first and second guide members each configured to engage with the connector such that a portion of the connector winds partially about each one of the two guide members such that displacement of the connector second end is greater than displacement of the connector first end as the input member moves toward the maximum position.

47. An actuator for an engine of a vehicle, the engine including a carburetor having a throttle plate moveable between a minimum open position and a maximum open position, the actuator comprising:

an input member movably coupled with the vehicle so as to be displaceable between an initial position and a maximum displaced position;

a flexible connector having a first end connected with the input member and a second end connected with the throttle plate such that movement of the input member displaces the connector to move the throttle plate between the minimum and maximum positions; and a guide configured to direct movement of the connector such that a rate of displacement of the throttle plate is varied as the input member moves between the initial and maximum positions;

wherein the connector first end is alternatively connectable with the input member so as to be nonengageable by the guide such that the throttle rate displacement is generally constant as the input member moves between the initial and maximum displaced positions.

* * * * *